United States Patent [19]

Leskoverc et al.

[11] 4,361,741
[45] Nov. 30, 1982

[54] SWITCH ACTUATOR APPARATUS

[75] Inventors: Edward V. Leskoverc, Eastlake; Richard A. Schwehr, Mentor, both of Ohio

[73] Assignee: Towmotor Corporation, Mentor, Ohio

[21] Appl. No.: 273,890

[22] PCT Filed: Dec. 19, 1980

[86] PCT No.: PCT/US80/01705
§ 371 Date: Dec. 19, 1980
§ 102(e) Date: Dec. 19, 1980

[87] PCT Pub. No.: WO82/02173
PCT Pub. Date: Jul. 8, 1982

[51] Int. Cl.³ .................. B60K 28/00; H01H 3/14
[52] U.S. Cl. .................. 200/85 A; 180/273; 340/667
[58] Field of Search .................. 200/85 R, 85 A; 180/273, 290; 340/667; 188/109; 307/10 SB

[56] References Cited

U.S. PATENT DOCUMENTS

| 2,708,005 | 5/1955 | Gazzo | 180/82 |
| 3,437,993 | 4/1969 | Recio et al. | 340/53 |
| 3,500,946 | 3/1970 | Boyajian | 180/101 |
| 3,703,618 | 11/1972 | Lewis | 200/85 R |
| 3,704,352 | 11/1972 | Fontaine | 200/85 R |
| 3,757,067 | 9/1973 | Eberle | 200/85 A |
| 3,829,803 | 8/1974 | Maeda | 200/85 A |
| 4,075,443 | 2/1978 | Fatur | 200/85 A |

FOREIGN PATENT DOCUMENTS 1048784 1/1959 Fed. Rep. of Germany .

Primary Examiner—Thomas J. Kozma
Assistant Examiner—D. A. Tone
Attorney, Agent, or Firm—Alan J. Hickman

[57] ABSTRACT

This invention relates to an apparatus (40,122) for actuating an electrical switch (42,124) which eliminates the problems of over stressing and inadvertent cyclical actuation of the switch (42,124) and flexing of electrical connecting wires (66,168). The apparatus (40,122) has an actuator spring (44,126) movable in response to a load applied to a seat assembly (10,110) for applying an actuating force to the switch (42,124) of a magnitude less than the load applied to the seat assembly (10,110) and a bracket (56,140) for limiting the magnitude of force applied to the switch (42,124) to a preselected maximum value. The apparatus (40,122) eliminates premature switch failure, inadvertent cyclical switch actuation and electrical wire breakage. The actuating apparatus (40,122) is particularly useful on a vehicle such as a lift truck.

14 Claims, 3 Drawing Figures

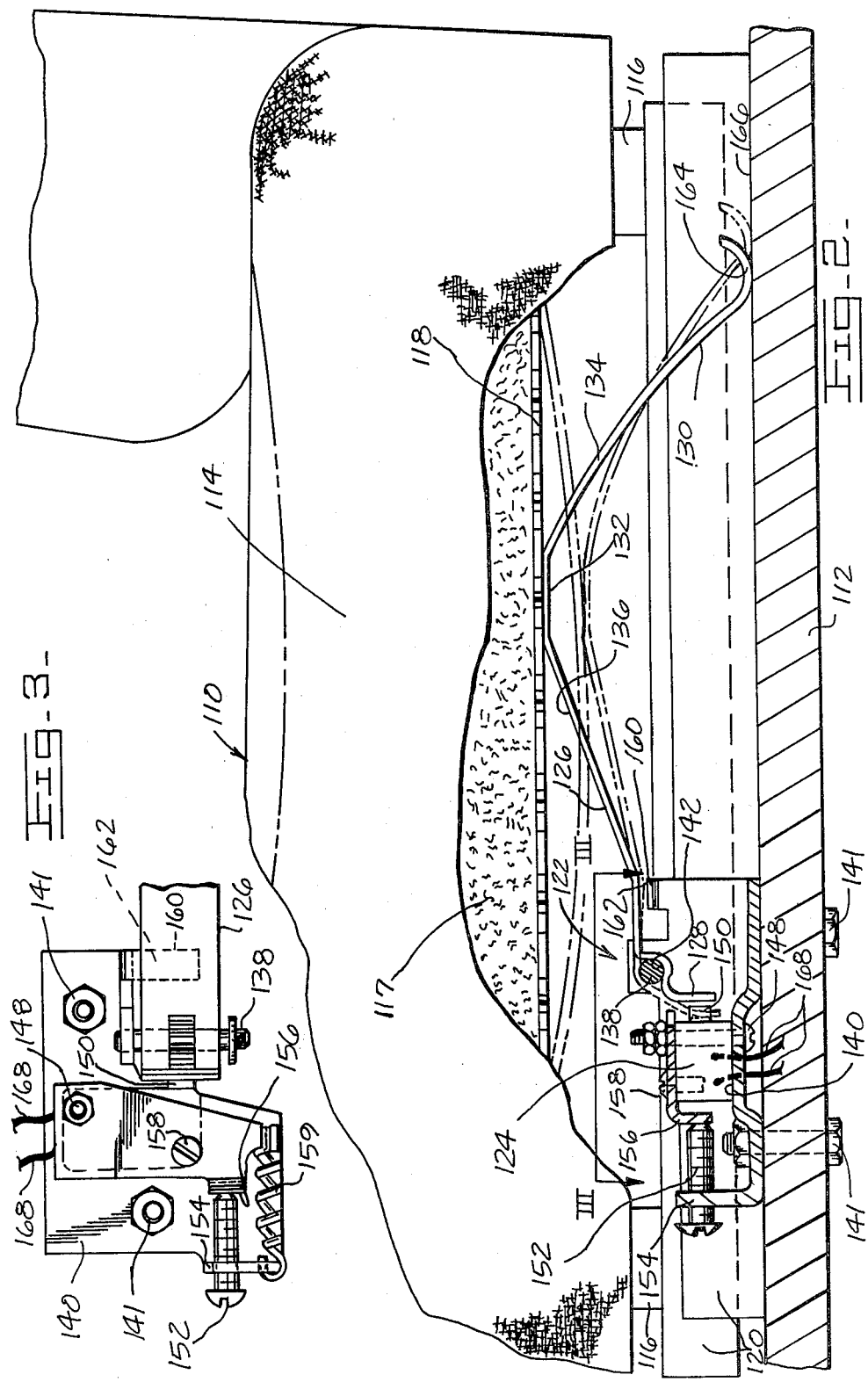

SWITCH ACTUATOR APPARATUS

TECHNICAL FIELD

This invention relates to an apparatus for actuating a switch and more particularly to an apparatus for controllably actuating a switch in response to a seat assembly being moved to a preselected elevational position relative to a seat support frame of a vehicle.

BACKGROUND ART

Apparatuses for actuating a switch in response to elevational movement of at least a portion of a seat assembly of a vehicle such as a lift truck are well known in the art. Examples of such systems are shown in U.S. Pat. No. 2,708,005 to Gazzo issued May 10, 1955, U.S. Pat. No. 3,437,993 to Recio et al issued Apr. 8, 1969, U.S. Pat. No. 3,500,946 to Boyajian issued Mar. 17, 1970; U.S. Pat. No. 3,703,618 to Lewis issued Nov. 21, 1972; U.S. Pat. No. 3,704,352 to Fontaine issued Nov. 28, 1972, U.S. Pat. No. 4,075,443 to Fatur issued Feb. 21, 1978, and German Pat. No. 1,048,784 issued Jan. 15, 1959.

Such apparatuses are often disposed between the seat assembly and the switch for actuating the switch in response to movement of the seat assembly toward the switch due to the weight of a vehicle operator being seated thereon and for deactivating the switch in response to movement of the seat assembly away from the switch due to the weight of the vehicle operator being removed therefrom.

Typically such switches are operatively connected to a vehicle system for establishing an on or off condition of the system, as determined by an occupied or unoccupied vehicle seat assembly, and permitting or preventing travel of the vehicle.

It has been found that during operation of the vehicle over rought terrain prior switch actuating apparatuses are often too sensitive to seat assembly movement which causes cyclical and undesirable actuation of the switch between the actuated and unactuated positions which results in turning on and off the vehicle system.

Such prior actuating apparatuses do not have provisions for limiting the maximum amount of actuating force applied to the switch. Since the weight of the operator under dynamic conditions applies a variable force to the seat assembly of a substantial magnitude and the force applied to the switch is proportional to the force on the seat, a condition may be developed when the switch actuating force is beyond the structural limits of the switch. This excessive force can cause premature failure of the switch which will result in down time of the vehicle.

Often the switch is mounted on the seat assembly for elevational movement with or in response to elevational movement of the seat assembly. When this movement is appreciable, substantial flexing of electrical wires connecting the switch to the vehicle system is observed. This flexing frequently causes breakage of the wires which causes vehicle downtime. Also, since the switch is mounted on the seat assembly removal of the seat assembly from the vehicle or movement of the seat assembly for operator comfort adjustment in a horizontal direction relative to a seat support surface causes substantial flexing, stretching and bending of the wires. Also, removal of the seat assembly frequently requires disconnection or removal of the switch. In addition, such systems do not include a provision wherein ease of adjustment of the actuating apparatus can be made for establishing the minimum weight on the seat at which switch actuation is achieved.

The present invention is directed to overcoming one or more of the problems as set forth above.

Disclosure of the Invention

In one aspect of the present invention an apparatus for controllably actuating a switch mounted on a support frame is provided. The actuating apparatus is operatively associated with a vehicle seat and the switch for applying an actuating force to the switch of a smaller magnitude than a force applied to the seat and limits the force applied to the switch to a preselected maximum value which is less than the force applied to the seat.

BRIEF DESCRIPTION OF THE DRAWINGS

FIG. 2 is a diagrammatic side elevational view of an alternate embodiment of the seat assembly and actuating apparatus of the present invention with portions thereof broken out and in section; and FIG. 3 is a diagrammatic top elevational view of the actuating apparatus taken along the line III—III of FIG. 2.

BEST MODE FOR CARRYING OUT THE INVENTION

Figure 1:
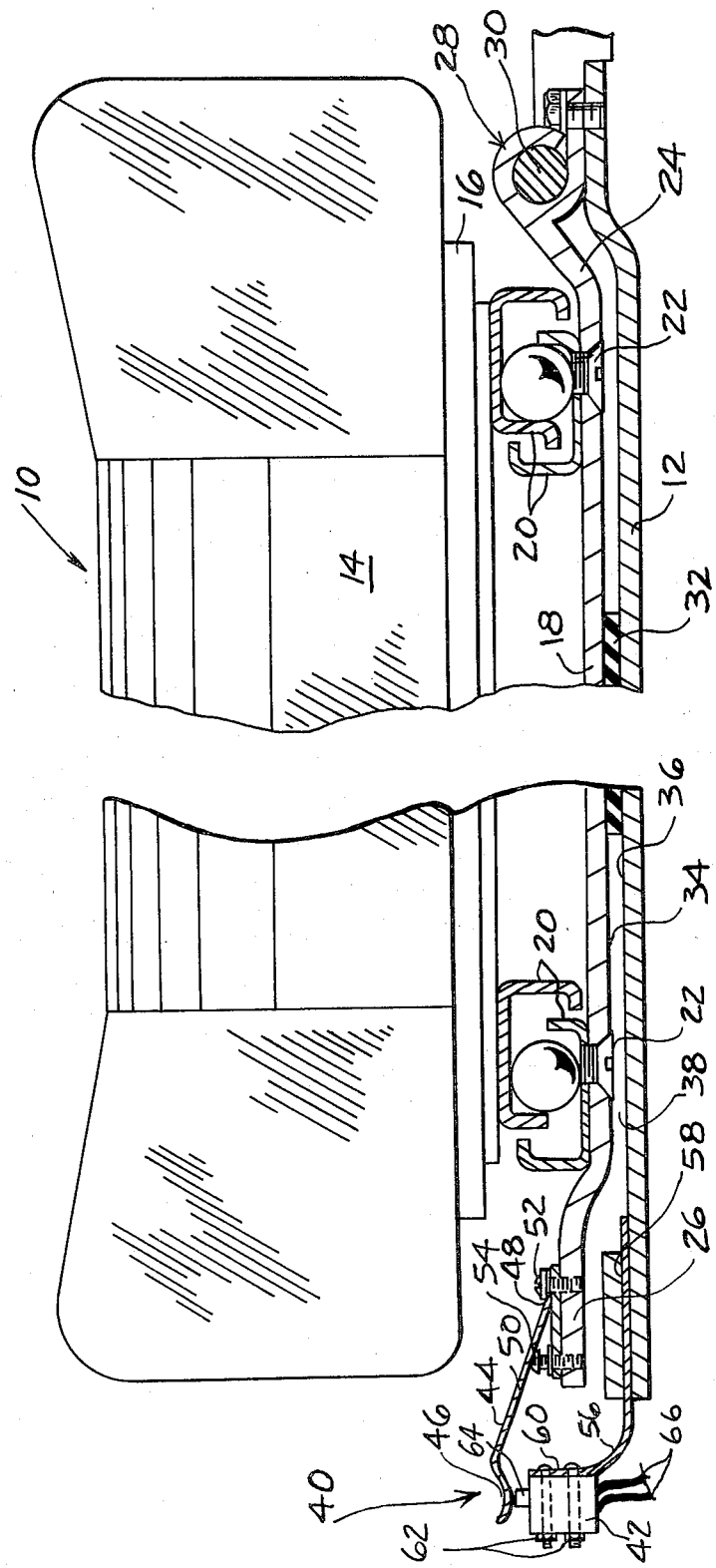
FIG. 1 is a diagrammatic front elevational view of the seat assembly and actuating apparatus of the present invention with portions thereof broken out and in section.

Referring to the preferred embodiment of FIG. 1, a seat assembly 10, for a vehicle such as a lift truck (not shown) is pivotally attached to a support frame 12, which may be the frame of the vehicle. The seat assembly 10 includes a seat 14 having a base 16 and a connecting frame 18. The seat 14 is mounted on the connecting frame 18 and the connecting frame is pivotly secured to the support frame 12. More specifically, the base 16 of the seat 14 is mounted on and rigidly secured to a guide rail assembly 20 in any suitable manner and the guide rail assembly is mounted on the connecting frame 18 and secured thereto by threaded fasteners 22. The guide rail assembly 20 is of a construction well known in the art and permits selected guided movement of the seat in a horizontal plane parallel to the connecting frame 18 so as to provide comfortable seating for a vehicle operator.

The connecting frame 18 has a first and second end portion 24,26. The first end portion 24 is pivotly secured to the support frame by a hinge assembly 28 having a pivot pin 30. The connecting frame 18 of the seat assembly 10 is elevationally movable relative to the support frame 12 as it pivots about pin 30.

A resilient member 32, of preferably rubber material, but may include coil or leaf springs, is disposed between a lower surface 34 of the connecting frame 18 and an upper surface 36 of the support frame 12 at a location spaced from the pivot pin 30. More specifically, the resilient member is affixed to the upper surface 36 of the support frame, in any suitable manner, so as to be in contacting engagement with the lower surface 34 of the connecting frame 18 at a location between the first and second end portions 24,26. If is to be noted that the resilient member 32 maintains a gap or space 38 between the upper and lower surfaces 36,34 when the seat is unoccupied. The placement of a load on the seat 14 will cause compression of the resilient member 32 resulting in a reduction of the space or gap 38.

An actuator apparatus 40 is operatively associated with the seat assembly 10 and a switch 42. The actuator apparatus 40 includes an actuator spring 44 which has a first and second end portion 46,48. The actuator spring 44 is preferably a leaf spring 50, however, other types of springs such as coil or torsion would be suitable substitutes. The second end portion 48 of the leaf spring 50 is securely attached to the connecting frame 18, at a location on the connecting frame spaced from the pivot pin 30, by a threaded fastener 52 and the first end portion 46 of the leaf spring 50 is free from connection with the connecting frame 18. The second end portion 48 of the leaf spring 50 is preferably connected to the second end portion 26 of the connecting frame 18 and the first end portion 46 extends to terminate in an arcuate shape at a location spaced further away from the pivot pin 30 than the connection of the springs second end portion 48 and beyond the connecting frame's second end portion 26.

An adjustment screw 54 is threadably connected to the second end portion 26 of the connecting frame 18 and threadably extensible relative to the connecting frame 18. The screw 54 is contactable with the spring 50 for selectively determining the elevational position of the first end portion 46 of the spring 50 relative to the connecting frame and the switch 42.

The switch 42 is connected to the support frame 12 by a bracket 56. Preferably the bracket is "L" shaped and constructed of a resilient material such as spring steel. One end portion 58 of the bracket 56 is connected to the support frame 12 in any suitable manner and the other end portion 60 is connected to the switch 42 such as by fasteners 62. Specifically, the resilient bracket 56, suspends and positions the switch 42 directly beneath the first end portion 46 of the actuator spring 44.

The switch 42 has a plunger 64 which is movable in response to an external force applied thereto for placing the switch in one of an open and closed position. The switch 42 is also movable from one of said open and closed positions to the other of the open and closed positions in response to the force being removed therefrom. Such switch construction is well known in the art and will not be discussed in further detail. A plurality of electrical wire leads 66 are connected at one end to the switch 42. The other end of the leads 66 are connected to an electrical vehicle system (not shown). The electrical vehicle system is operative in response to the switch being in one of the open and closed positions and inoperative in response to the switch being in the other of the open and closed positions.

Referring to the alternate embodiment of FIG. 2, a seat assembly 110, is affixed to a support frame 112, which may be the frame of a vehicle. The seat assembly 110 includes a seat 114 having a base 116, a cushion 117 and cushion suspension springs 118. Such a construction is well known in the art and will not be discussed in any greater detail. The base 116 of seat 114 is mounted on and rigidly secured to a guide rail assembly 120 and the guide rail assembly 120 is mounted on and rigidly secured to the support frame 112. The guide rail assembly 120 is of a construction well known in the art and permits selected guided movement of the seat 114 in a horizontal plane parallel to the support frame 112 so as to provide adjustment for comfortable seating by a vehicle operator.

An actuator apparatus 122 is operatively associated with the seat assembly 110 and a switch 124. The actuator apparatus includes an actuator spring 126 which has a first and second end portion 128,130 and a middle portion 132. Preferably, the actuator spring 126 is an elongated arcuate shaped leaf spring 134 having an upper surface 136. The first end portion 128 of the actuator spring 126 is pivotly connected to a pivot pin 138 of a support bracket 140. The support bracket is securely fastened to the support frame 112 by fasteners 141. More specifically, the first end portion 128 of the leaf spring 134 has an aperature 142 defined therein which is open in a transverse direction relative to the elongated extension of the leaf spring. The pin 138 is disposed in the aperature 142 and permits pivotal movement of the first, second and middle portions 128,130,132 of the actuator spring 126 about said pin.

Referring to FIGS. 2 and 3, the switch 124 is pivotly attached to the bracket 140 by fastener 148 so that a plunger 150 faces the first end portion 128 of the leaf spring 134. The plunger 150 is movable in response to an external force applied thereto for placing the switch 124 in one of an open and closed position and movable from one of the open and closed positions in response to the force being removed therefrom to the other of the open and closed positions. Such switch construction is well known in the art and will not be discussed in further detail. An adjustment screw 152 is screw threadably secured to a vertical end portion 154 of the bracket 140 and passes through the end portion 154 to engage the switch 124.

Preferably the screw 154 engages a flange 156 which is rigidly secured to the switch 124 by fasteners 158. A tension spring 159 connected between the vertical end portion 154 and the flange 156 biases the switch 124 to pivot about the fastener 148 and maintains the flange 156 in contact with the adjustment screw 152. Therefore adjustment of the screw 152 will cause the switch to move toward or away from the first end portion 128 of the actuator spring 126. The bracket 140 further includes a stop 160. The stop 160 is elevationally positioned between the actuator spring 126 and the support frame 112, and between the first and second end portions 128,130 of the actuator spring 126. The stop is a substantially rectangular tab 162 which extends from the bracket 140 a preselected distance at a location adjacent the pivot pin 138 transverse to the elongate extension of the leaf spring 134 to pass beneath the leaf spring. The rectangular tab 162 is best located between the pivot pin 138 and the middle portion 132 of the leaf spring 134 and at an elevational location within a horizontal projection of the diameter of the pivot pin 138.

The second end portion 130 of the actuator spring 126 terminates in a curvalinear portion 164. The curvalinear portion is in slideable tangential contact with an upper surface 166 of the support frame 112.

The middle portion of the actuator spring 126 and specifically the upper surface 136 thereof is in continuous contact with at least a portion of the cushion suspension springs 118. Any elevational movement of the cushion suspension springs will result in elevational movement of the leaf spring 134.

A plurality of electrical wire leads 168 are connected at an end of the switch 124. The other end of the leads 168 are connected to an electrical vehicle system. The electrical vehicle system is therefore operative in response to the switch being in one of the open and closed positions and inoperative in response to the switch being in the other of the open and closed positions.

INDUSTRIAL APPLICABILITY

Referring to the preferred embodiment of FIG. 1, the seat assembly 10 is shown in the unloaded position, i.e. without a vehicle operator seated thereon. In this position the resilient member 32 maintains the gap 38 between the lower surface 34 of the connecting frame 18 and the upper surface 36 of the support frame 12 at a maximum by urging the connecting frame 18 about the pivot pin 30 away from the support frame 12. At this position the first end portion 46 of the actuating spring 44 is spaced from contact with the plunger 64 of switch 42 and the switch 42 is in one of the open and closed positions. In this position, the vehicle system is conditioned to prevent the vehicle from travel, for example, by applying a brake, neutralizing a transmission or disabling a prime mover.

When a load is applied to the seat 14 of the seat assembly 10 the load will cause the seat assembly 10 to pivot about pin 30 in a direction toward the support frame 12. This pivotal motion will cause the connecting frame and more importantly second end portion 26 of the connecting frame 18 to move toward the support frame 12 by compressing the resilient member 32 a variable amount as determined by the load placed upon the seat 14. The actuator spring 44, of the actuator assembly 40, being attached to the connecting frame 18 will move in its entirety with the connecting frame until the first end portion 46 of the actuator spring 44 contacts and forceably depresses the plunger 64 of the switch for actuating the switch 42 to the other of the open and closed positions. In this position the vehicle system would be conditioned to permit vehicle movement. It is to be noted that the force applied to the switch is proportional to the load on the seat 14 but substantially less than the load.

Further movement of the connecting frame 18 of the seat assembly 10 toward the support frame 12, subsequent to depression of the plunger 64 and actuation of the switch 42 will result in no movement of the first end portion 46 of the actuator spring relative to the switch 42 as the second end portion 48 moves with the connecting frame 18. Both the first end portion 46 of the actuator spring 44 and the resilient bracket 56 supporting the switch 42 will move together slightly when the force applied to the switch 42 by the first end portion 46 of the actuator spring reaches a preselected magnitude which is substantially less than the load applied to the seat assembly. This will prevent excessive loading of the switch and reduce premature failure thereof.

The spring 44 of the actuator assembly 40 also acts to resist cyclical actuation of the switch 42 due to oscillation of the seat assembly and its load caused by the vehicle operating over rough terrain. The actuator spring 44 is adjustable between spaced elevational positions relative to the connecting frame by the adjusting screw 54. This permits the first end portion 46 of the actuator spring to be positioned elevationally relative to the switch 42 to establish a minimum force on the seat 14 at which the plunger 64 is contacted and the switch 42 actuated. This minimum seat force is substantially less than the average weight of an operator and therefore any slight elevational movement of the connecting frame due to bouncing will not deactivate the switch and prevent the vehicle from travelling.

It is to be noted that the wire leads 66 from the switch 42 to the vehicle system encounter substantially very little movement during operation of the vehicle and with the seat 14 occupied. Thus failure due to wire breakage will be lessened.

Referring to the alternate embodiment of FIGS. 2 and 3, the seat assembly 110 and actuating apparatus 122 is shown in an unloaded position in solid lines and in a loaded position in phantom lines.

In the unloaded position, i.e. the vehicle operator is not seated thereon, the seat 114 and cushion support spring 118 are at an undeflectedelevational position and the first end portion 128 of the actuator spring 126 is spaced from contact with the plunger 150. Therefore, the switch is in one of the open and closed positions and the electrical vehicle system is conditioned to prevent the vehicle from travel such as, for example, by applying a brake, neutralizing a transmission or disabling a prime mover.

When a load is applied to the seat 114 of the seat assembly 110 the weight of the load will cause the cushion suspension springs 118 to deflect toward the support frame 112. The change in the elevational position of the cushion suspension springs 118 will result in equivalent elevational movement of the middle portion 132 of the actuator spring 126 of the actuator apparatus 122 since the middle portion 132 and specifically the upper surface 136 is in continuous contact with at least a portion of the seat suspension spring 118. This elevational movement of the middle portion 132 will cause both the first and second end portions 128,130 of the actuator spring 126 to move in a predetermined proportional manner. The second end portion 130 will move elevationally but will also deflect outwardly as the curvalinear portion 164 slides along the surface 166 to a location determined by the load placed on the seat assembly 110. Such a location is shown by phantom lines on FIG. 2. The first end portion 128 will also move, however, in a different manner. Since the first end portion 128 is pivotaly connected to pivot pin 138 deflection of the actuator spring toward the support frame 112 will result in pivotal movement of the first end portion 128 about the pivot pin 138 toward the switch 124. This movement will result in forceable engagement of the plunger 150 and translation thereof. It is to be noted that this construction eliminates inadvertent cyclical actuation of the switch by isolating the switch 124 from direct contact with the seat assembly. Thus, the switch will be actuated to the other of the open and closed positions at which the electrical vehicle system is conditioned to permit vehicle travel such as by releasing the brake, engaging the transmission or enabling the prime mover.

The stop 160 has been provided to limit the amount of pivotal movement of the first end portion 128 of the actuator spring 126. Since the force applied to the plunger 150 and ultimately the switch 124 by the first end portion 128 of the actuator assembly is less than the weight of the load on the seat assembly 110 but proportional thereto it is necessary to establish a maximum force limit. This is achieved by placing a limit on the permissible amount of pivotal movement the first end portion 128. When the load on the seat reaches a preselected maximum magnitude, the deflection of the cushion suspension spring 118 and the actuator spring 122 will force the actuator spring closely adjacent the first end portion 128 of the actuator spring to pivot about pin 138 until it engages the stop 160. Further deflection of the actuator spring 122 due to loads in excess of the preselected maximum magnitude will not result in additional pivotal motion of the first end portion 128 on either side of the pin 138 and therefore the force on the switch will be limited.

The minimum force required to actuate the switch 124 by depressing the plunger 150 is determined by adjusting the position of the switch 124 relative to the first end portion 128 of the actuator spring 126. This is achieved by rotating the adjusting screw 152 which pivotly moves the switch 124 about fastener 148.

It is to be noted that the switch 124 does not move under normal operation and therefore the electrical wire leads 168 are not subjected to flexing and the like.

Therefore, the embodiments herein described eliminate over stressing of the electrical switch and premature switch failure, inadvertent cyclical switch actuation, and electrical wire breakage.

Other aspects, objects and advantages of the invention can be obtained from a study of the drawings, disclosure and appended claims.

We claim:

1. An apparatus (40,122) for controllably actuating a switch (42,124) mounted on a support frame (12,112) in response to a load being applied to a seat assembly (10,110) comprising:

actuator means (44,56,126,138,140,160) operatively associated with said seat assembly (10,110) and said switch (42,124) for sensing elevational movement of said seat assembly (10,110) relative to said support frame (12,112) and applying an actuating force to said switch (42,124) of a magnitude less than the load applied to said seat assembly (10,110), and for limiting the magnitude of force applied to said switch (42,124) to a preselected maximum value which is substantially less than the load being applied to said seat assembly (10,110);

said actuator means (44,56,126,138,140,160) includes an actuator spring (44,126) having a first end portion (46,128) and a second end portion (48,130), said first end portion (46,130) being contactable with said switch (42,124) and forceably engageable therewith in response to movement of the seat assembly (10,110) towards said support frame (12,112).

2. The apparatus (40,122) as set forth in claim 1 wherein said actuator spring (44,126) is a leaf spring (50,134).

3. The apparatus (40) as set forth in claim 2 wherein the second end portion (48) of said actuator spring (44) is connected to said seat assembly (10).

4. The apparatus (40) as set forth in claim 3 wherein said seat assembly (10) includes a seat (14) having a base (16) and a connecting frame (18), said base (16) being attached to said connecting frame (18), said connecting frame (18) being pivotly connected to said support frame (12) by a pivot pin (30), and, resilient means (32) disposed between said connecting frame (18) and said support frame (12) for urging said seat assembly (10) away from said support frame (12) about said pivot pin (30).

5. The apparatus (40) as set forth in claim 4 wherein the second end portion (48) of said actuator spring (44) is rigidly secured to said connecting frame (18) at a location spaced from said pivot pin (30) and movable therewith; and said first end portion (46) of the actuator spring (44) being movable relative to said connecting frame (18), subsequent to contacting engagement with said switch (42) and actuation thereof, a preselected amount.

6. The apparatus (40) as set forth in claim 4 wherein said connecting frame has a first and second end portion (24,26), and said resilient means (32) is a rubber pad affixed to said support frame (12) and in engagement with said connecting frame (18) at a location between the first and second end portion (24,26).

7. The apparatus (122) as set forth in claim 2 wherein said actuator spring has a middle portion (132) slidably engaged with said seat assembly (110), and said second end portion (130) is slidably engaged with said support frame (112).

8. The apparatus (122) as set forth in claim 7 wherein said actuator means (126,138,140,160) includes a bracket (140) mounted on said support frame (112) and said switch (124) mounted on said bracket (140), said actuator spring (126) being pivotly connected between the first and second end portions (128,130) of said actuator spring (126) to said bracket (138) by a pivot pin (138).

9. The apparatus (122) as set forth in claim 8 wherein said seat assembly (110) includes a seat (114), a cushion (117) and a cushion suspension spring (118) resiliently supporting said cushion (114), said middle portion (132) of said actuator spring (126) being in continuous contact with said cushion suspension spring (118) and deflectably movable in response to elevational deflection of said cushion suspension spring (118).

10. The apparatus (122) as set forth in claim 8 wherein said actuator means (126,138,140,160) includes a stop (160) connected to said bracket (140) and extending therefrom to a location between said actuator spring (126) and said support frame (112) and between said first and second end portions (128,130) of said actuator spring (126), said stop (160) being engageable by said actuator spring (126) in response to a preselected amount of movement of said actuator spring (126) toward said support frame (112).

11. The apparatus (40,122) as set forth in claim 1 including means (54,152) for adjusting the relative position of said actuator means (44,56,126,138,140,160) and said switch (42,124) and establishing a minimum seat assembly load at which said switch (42,124) is actuated.

12. The apparatus (40,122) as set forth in claim 11 wherein said adjusting means (54,152) includes an adjustment screw (54,152) engageable with one of said switch (42,124) and said actuator spring (44,126) and selectively positionable to move one of said switch (42,124) and actuator spring (44,126) relative to the other of said switch (42,124) and actuator spring (44,126).

13. The apparatus (40) as set forth in claim 1 wherein said actuation means includes a resilient bracket (56) connecting said switch (42) to said support frame (12).

14. The apparatus (122) as set forth in claim 1 wherein said actuator means (126,138,140,160) includes a stop (160) operatively associated with said actuator spring (126) and contactable therewith in response to a preselected amount of elevational movement of at least a portion of said seat assembly (110) toward said support frame (112).

* * * * *